(12) United States Patent
Sikri et al.

(10) Patent No.: US 9,167,446 B2
(45) Date of Patent: Oct. 20, 2015

(54) APPARATUS AND METHOD FOR MITIGATING VOLTAGE DROOP IN A DUAL-TRANSCEIVER WIRELESS COMMUNICATION DEVICE

(71) Applicant: QUALCOMM Incorporated, San Diego, CA (US)

(72) Inventors: Divaydeep Sikri, Farnborough (GB); Mungal Singh Dhanda, Slough (GB); William Stancer, Reading (GB); Francis Ming-Meng Ngai, Louisville, CO (US); Simon Walke, Basingstoke (GB)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 13/772,991

(22) Filed: Feb. 21, 2013

(65) Prior Publication Data

US 2014/0200046 A1 Jul. 17, 2014

Related U.S. Application Data

(63) Continuation-in-part of application No. 13/743,329, filed on Jan. 16, 2013, now Pat. No. 9,026,125.

(51) Int. Cl.
*H04W 24/02* (2009.01)
*H04W 52/24* (2009.01)
(Continued)

(52) U.S. Cl.
CPC ............... *H04W 24/02* (2013.01); *H04B 1/005* (2013.01); *H04B 1/109* (2013.01); *H04B 1/1607* (2013.01); *H04B 1/3816* (2013.01);
(Continued)

(58) Field of Classification Search
CPC ... H04W 24/02; H04W 52/243; H04W 52/04; H04W 52/0209; H04W 88/05; H04W 52/38; H04W 52/146; H04B 1/3838; H04B 1/1607; H04B 1/525; H04B 1/3816; H04B 1/109; H04B 1/005
USPC ......... 455/550.1, 552.1, 553.1, 572–574, 522
See application file for complete search history.

(56) References Cited

U.S. PATENT DOCUMENTS

| | | |
|---|---|---|
| 4,192,970 A | 3/1980 | Kahn |
| 6,677,736 B1 | 1/2004 | Barnes et al. |

(Continued)

FOREIGN PATENT DOCUMENTS

| | | |
|---|---|---|
| GB | 2492577 A | 1/2013 |
| WO | 2009062188 A1 | 5/2009 |
| WO | WO-2012142770 A1 | 10/2012 |

OTHER PUBLICATIONS

International Search Report and Written Opinion—PCT/US2014/011312—ISA/EPO—Apr. 23, 2014.

*Primary Examiner* — Brandon Miller
(74) *Attorney, Agent, or Firm* — Loza & Loza LLP

(57) ABSTRACT

Aspects of the present disclosure relate to a user equipment (UE) and a method of wireless communication using the UE that includes a first transceiver and a second transceiver. The method includes determining that the first transceiver is scheduled to communicate using a first transmission simultaneous to the second transceiver being scheduled to communicate using a second transmission, and altering an operation of at least one of the first and second transceivers to mitigate battery voltage droop due to simultaneous transmissions of the transceivers. Other aspects, embodiments, and features are also claimed and described.

32 Claims, 8 Drawing Sheets

(51) Int. Cl.

| | | |
|---|---|---|
| *H04B 1/3827* | (2015.01) | |
| *H04W 52/04* | (2009.01) | |
| *H04W 52/02* | (2009.01) | |
| *H04B 1/16* | (2006.01) | |
| *H04B 1/525* | (2015.01) | |
| *H04B 1/3816* | (2015.01) | |
| *H04W 88/08* | (2009.01) | |
| *H04B 1/10* | (2006.01) | |
| *H04B 1/00* | (2006.01) | |
| *H04W 52/38* | (2009.01) | |
| *H04W 52/14* | (2009.01) | |

(52) U.S. Cl.
CPC .............. *H04B 1/3838* (2013.01); *H04B 1/525* (2013.01); *H04W 52/0209* (2013.01); *H04W 52/04* (2013.01); *H04W 52/243* (2013.01); *H04W 52/38* (2013.01); *H04W 88/08* (2013.01); *H04W 52/146* (2013.01)

(56) References Cited

U.S. PATENT DOCUMENTS

| | | |
|---|---|---|
| 7,035,346 B1 | 4/2006 | Burke et al. |
| 7,610,057 B2 | 10/2009 | Bahl et al. |
| 8,027,673 B2 | 9/2011 | Rolf et al. |
| 8,213,974 B2 | 7/2012 | Jarabek |
| 8,644,875 B2 * | 2/2014 | Kiukkonen et al. .......... 455/522 |
| 8,934,840 B1 * | 1/2015 | Yeung et al. ................. 455/41.2 |
| 2006/0067245 A1 | 3/2006 | Pearl |
| 2006/0234693 A1 * | 10/2006 | Isidore et al. .............. 455/422.1 |
| 2008/0026755 A1 * | 1/2008 | Venkataraman et al. ..... 455/436 |
| 2008/0062919 A1 | 3/2008 | Chen et al. |
| 2009/0181681 A1 | 7/2009 | Hammond et al. |
| 2009/0303975 A1 | 12/2009 | Xhafa et al. |
| 2010/0322287 A1 | 12/2010 | Truong et al. |
| 2011/0300805 A1 | 12/2011 | Gaikwad et al. |
| 2012/0027040 A1 | 2/2012 | Hata et al. |
| 2012/0069766 A1 | 3/2012 | Fu et al. |
| 2012/0082046 A1 | 4/2012 | Ho et al. |
| 2012/0120944 A1 | 5/2012 | Yang et al. |
| 2012/0176923 A1 | 7/2012 | Hsu et al. |
| 2012/0263047 A1 | 10/2012 | Love et al. |
| 2013/0012135 A1 | 1/2013 | Ruohonen et al. |
| 2014/0080459 A1 * | 3/2014 | Taha et al. .................. 455/414.1 |
| 2014/0199993 A1 | 7/2014 | Dhanda et al. |

\* cited by examiner

|  |  | IDLE | | CS | | | | PS | | |
| --- | --- | --- | --- | --- | --- | --- | --- | --- | --- | --- |
|  |  | No Tx/Rx | RACH | TCH | SACCH/SDCCH | FACCH | PDCH | PACCH | RRBP |
| IDLE | No Tx/Rx | No back-off | No back-off | No back-off | No back-off | No back-off | No back-off | No back-off | No back-off |
| CS | RACH | No back-off | Delay one RACH | Back-off TCH | Delay RACH | Delay RACH | Back-off PDCH | Delay RACH | Delay RACH |
|  | TCH | No back-off | Back-off TCH | Back-off on sub with call on hold (606) | Back-off TCH | Back-off TCH | Back-off PDCH | Back-off TCH (602) | Back-off TCH (602) |
|  | SACCH/SDCCH | No back-off | Delay RACH | Back-off TCH, if required | Back-off alternately each sub. (604) | Delay FACCH | Back-off PDCH | Delay PACCH | Back-off RRBP (602) |
|  | FACCH | No back-off | Delay RACH | Back-off TCH | Delay FACCH | Delay one FACCH | Back-off PDCH | Delay PACCH or FACCH | Delay FACCH |
| PS | PDCH | No back-off | Back-off PDCH | Back-off PDCH | Delay PDCH | Back-off PDCH | Back-off both subs | Back-off PDCH | Back-off PDCH |
|  | PACCH | No back-off | Delay RACH | Back-off TCH | Delay PACCH | Delay FACCH or PACCH | Back-off PDCH | Delay one PACCH | Delay PACCH |
|  | RRBP | No back-off | Delay RACH | Back-off TCH | Back-off RRBP | Delay FACCH | Back-off PDCH | Delay PACCH | Back-off alternately for each burst (602) |

*FIG. 6*

|  |  | Tx |  |  |  |  |  |  |  |
|---|---|---|---|---|---|---|---|---|---|
|  |  | Idle | CS | | | | PS | | |
|  |  | RACH | TCH | SACCH/SDCCH | SACCH (TCH) | FACCH | PDCH | PACCH | RRBP |
| Rx | Idle SCH PCH BCCH | Delay RACH | Cancel TCH (704) | SACCH/ SDCCH | SACCH (TCH) | Delay FACCH | Cancel PDCH (704) | Delay PACCH | RRBP (702) |
|  | TCH/ FACCH | RACH | Priority to active sub. (702) | SACCH/ SDCCH | SACCH (TCH) | FACCH | TCH (704) | PACCH (702) | RRBP (702) |
|  | CS SACCH/ SDCCH | Delay RACH | Cancel TCH (704) | SACCH/ SDCCH | Priority to active sub. (702) | Delay FACCH | SACCH/ SDCCH (704) | Delay PACCH | RRBP (702) |
|  | SACCH (TCH) | Delay RACH | Cancel TCH (704) | Priority to active sub. (702) | Priority to active sub. (702) | Delay FACCH | SACCH (TCH) | PACCH (702) | RRBP (702) |
|  | PDCH/ PACCH | RACH | TCH | SACCH (TCH) | SACCH (TCH) | FACCH | Tx PDCH | PACCH (702, 704) | RRBP (702) |
|  | PS T3192 running | RACH | TCH | SACCH/ SDCCH | SACCH (TCH) | FACCH | PDCH | PACCH (702) | RRBP (702) |

*FIG. 7*

APPARATUS AND METHOD FOR MITIGATING VOLTAGE DROOP IN A DUAL-TRANSCEIVER WIRELESS COMMUNICATION DEVICE

REFERENCE TO RELATED APPLICATIONS & PRIORITY CLAIM

This application is a continuation-in-part of U.S. Non-Provisional application Ser. No. 13/743,329, filed on 16 Jan. 2013, which is hereby incorporated by reference as if fully set forth below in its entirety and for all applicable purposes.

TECHNICAL FIELD

The technology discussed in this patent application relates generally to wireless communication systems, and more particularly, to apparatus and methods for mitigating battery voltage droop in multi-transceiver wireless communication devices. Features of the discussed technology enable power efficient communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the global system for mobile (GSM) network, which utilizes a GSM air interface. GSM is defined and supported by the $3^{rd}$ Generation Partnership Project (3GPP). Enhanced GPRS is an extension of GSM technology providing increased data rates beyond those available in second-generation GSM technology. EGPRS is also known in the field as Enhanced Data rates for GSM Evolution (EDGE), and IMT Single Carrier.

More recently, some mobile devices configured for EGPRS support multiple independent active connections to one or more access networks such that the user of the device can engage in voice or data communication on two different subscriptions simultaneously. For example, wireless mobile equipment (called user equipment or UE in 3GPP terminology such as GSM, but also called an access terminal, mobile station, etc. in various literature) uses dual subscriber identity modules (Dual-SIM) to store the subscriber's identity and for other security and authentication purposes in order to provide access to two subscriptions. These two subscriptions might be on the same network or on different networks. A device can utilize multiple transceivers such that the device can support multiple active connections at the same time. However, when multiple independent active connections occur simultaneously, the total transmit power may exceed the safe current limit, cause excessive voltage drop (droop) of the battery or heating of the device, and cause interference among the connections.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect, the disclosure provides a method of wireless communication using a user equipment (UE) including a first transceiver and a second transceiver. The method includes determining that the first transceiver is scheduled to communicate using a first transmission simultaneous to the second transceiver being scheduled to communicate using a second transmission, and altering an operation of at least one of the first and second transceivers to mitigate battery voltage droop due to simultaneous transmissions of the transceivers.

Another aspect of the disclosure provides an apparatus for wireless communication including: a first transceiver and a second transceiver; means for determining that the first transceiver is scheduled to communicate using a first connection simultaneous to the second transceiver being scheduled to communicate using a second connection; and means for altering an operation of at least one of the first and second transceivers to mitigate battery voltage droop due to simultaneous connections of the transceivers.

Another aspect of the disclosure provides a computer program product including a computer-readable storage medium that includes code for causing a user equipment (UE) including a first transceiver and a second transceiver to: determine that the first transceiver is scheduled to communicate using a first transmission simultaneous to the second transceiver being scheduled to communicate using a second transmission; and alter an operation of at least one of the first and second transceivers to mitigate battery voltage droop due to simultaneous transmissions of the transceivers.

Another aspect of the disclosure provides an apparatus for wireless communication including at least one processor, a communication interface including a first transceiver and a second transceiver both coupled to the at least one processor, and a memory coupled to the at least one processor. The at least one processor is configured to: determine that the first transceiver is scheduled to communicate using a first transmission simultaneous to the second transceiver being scheduled to communicate using a second transmission; and alter an operation of at least one of the first and second transceivers to mitigate battery power droop due to simultaneous transmissions of the transceivers.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a table illustrating a power control matrix for determining alteration to simultaneous transmissions to mitigate battery voltage droop according to some embodiments.

FIG. 7 is a table illustrating a power control matrix for determining alteration to simultaneous connections according to some embodiments.

DETAILED DESCRIPTION

Figure 1:
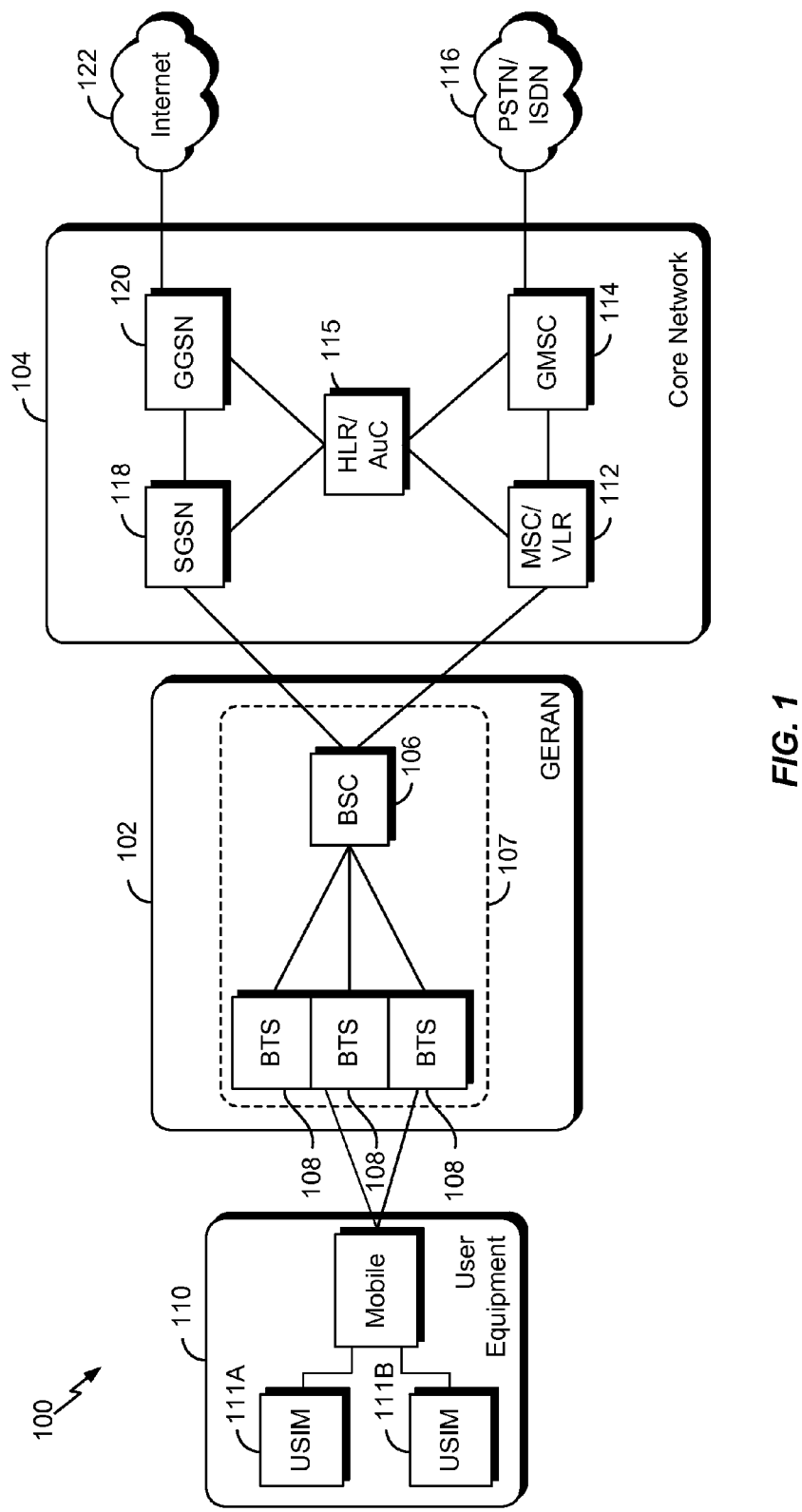
FIG. 1 is a block diagram conceptually illustrating an example of a telecommunications system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some modern wireless communication devices, such as mobile phones, include two or more radio transceivers, enabling simultaneous communication with two or more access networks. For example, a single device (e.g., a UE) might be able to connect to two different operators' GSM networks, or in another example, to one GSM network and to one W-CDMA network (a third-generation air interface defined and supported by the $3^{rd}$ Generation Partnership Project, 3GPP). Of course, such mobile devices might be enabled to communicate with any two networks in various examples. Such devices may be referred to as dual SIM, dual-SIM-dual-standby, dual-mode, or other similar terminology. When a single device utilizes two or more transceivers simultaneously, many issues can arise such as voltage droop, specific absorption rate (SAR), device overheating, and desense. Aspects of this disclosure provide methods and apparatus for addressing these issues.

Regarding voltage droop, when multiple transceivers attempt to transmit uplink (reverse link) transmissions at the same time, it can cause the device's battery voltage to droop temporarily. That is, the use of a transmitter invokes a power amplifier, which, especially if the transmission is at the maximum transmit power, draws a fairly substantial amount of current from the battery. This spike in current draw from the battery may result in a temporary drop in the voltage it provides to the mobile device. Here, when two transmitters simultaneously draw this current, the current drawn from the battery is the sum of the two current draws, and the voltage at the battery can droop by a fairly substantial amount. If the voltage droops below a certain threshold level, low-voltage detection circuitry at the mobile device might undesirably invoke a software shutdown of the modems, even when the battery is in fact fully charged.

Desense can occur when one transceiver transmits an uplink (reverse link) signal at the same time as another transceiver tries to receive a downlink (forward link) signal. Similarly, desense can occur when one transceiver transmits an uplink, the other transceiver may try to monitor, or make certain measurements of the air channel. In either of these cases, the transmission by the very proximate transmitter can cause strong interference to the receiving circuit, which is trying to receive a downlink transmission or measure channel characteristics at the same time. Aspects of the disclosure provide for algorithms operational at a mobile device itself, without necessitating intervention by the base station or the network, to address the above-described issues.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Global System for Mobile (GSM) network 100. A GSM network includes three interacting domains: a core network 104, a radio access network (RAN) (e.g., the GSM/EDGE Radio Access Network (GERAN) 102), and user equipment (UE) 110. In this example, the illustrated GERAN 102 may employ a GSM air interface for enabling various wireless services including telephony, video, data, messaging, broadcasts, and/or other services. The GERAN 102 may include a plurality of Radio Network Subsystems (RNSs) such as an RNS 107, each controlled by a respective Base Station Controller (BSC) such as a BSC 106. Here, the GERAN 102 may include any number of BSCs 106 and RNSs 107 in addition to the illustrated BSCs 106 and RNSs 107. The BSC 106 is an apparatus responsible for, among other things, assigning, reconfiguring, and releasing radio resources within the RNS 107.

The geographic region covered by the RNS 107 may be divided into a number of cells, with a radio transceiver apparatus serving each cell. A radio transceiver apparatus is commonly referred to as a base transceiver station (BTS) in GSM applications, but may also be referred to by those skilled in the art as a base station (BS), a Node B, a radio base station, a radio transceiver, a transceiver function, a basic service set (BSS), an extended service set (ESS), an access point (AP), or some other suitable terminology. For clarity, three BTSs 108 are shown in the illustrated RNS 107; however, the RNSs 107 may include any number of wireless BTSs 108. The BTSs 108 provide wireless access points to a GPRS core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning devices. The mobile apparatus is commonly referred to as user equipment (UE) in GSM applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The GSM "Um" air interface generally utilizes GMSK modulation (although later enhancements such as EGPRS, described below, may utilize other modulation such as 8 PSK), combining frequency hopping spread spectrum transmissions with time division multiple access (TDMA), which divides a frame into 8 time slots. Further, frequency division duplexing (FDD) divides uplink and downlink transmissions using a different carrier frequency for the uplink than that used for the downlink. Those skilled in the art will recognize that although various examples described herein may refer to GSM Um air interface, the underlying principles are equally applicable to any other suitable air interfaces.

In some aspects of the disclosure, the GSM system 100 may be further configured for enhanced GPRS (EGPRS). EGPRS is an extension of GSM technology providing increased data rates beyond those available in 2 G GSM technology. EGPRS is also known in the field as Enhanced Data rates for GSM Evolution (EDGE), and IMT Single Carrier.

In EGPRS, when a physical connection is established between the UE 110 and a BTS 108, this connection is referred to as a temporary block flow (TBF), and the GERAN is said to operate in an EGPRS TBF mode. In general, a TBF is allocated radio resources on one or more packet dedicated channels (PDCHs), and includes a number of RLC/MAC blocks that carry one or more LLC protocol data units (PDUs). TBFs are temporary, and are maintained only for the duration of the data transfer.

Specific examples are provided below with reference to the EGPRS system. However, the concepts disclosed in various aspects of the disclosure can be applied to any time-division-based system, such as but not limited to a UMTS system using a TD-SCDMA air interface, or an e-UTRA system using a TD-LTE air interface. Especially in the multi-SIM examples (described in further detail below), the multiple subscriptions might be on any one or more of these systems.

That is, in some aspects of the disclosure, the UE 110 may include a plurality of universal integrated circuit cards (UICC), each of which may run one or more universal subscriber identity module (USIM) applications. A USIM stores the subscriber's identity, and provides a user's subscription information to a network as well as performing other security and authentication roles. The illustrated UE 110 includes two USIMs 111A and 111B, but those of ordinary skill in the art will understand that this is illustrative in nature only, and a UE may include any suitable number of USIMs. UEs such as the UE 110 may have multiple transceivers such that the UE is capable of being active on two connections (or subscriptions) concurrently or simultaneously. In this way, connections or calls may be established simultaneously on multiple networks or subscriptions with a single device. The transceivers can be operated in a number of operating states during simultaneous operation. For example, the operating states include an idle state, a circuit-switched (CS) connection state, a packet-switched (PS) connection state, and a dual transfer mode (DTM) connection state. [Inventors: please briefly explain DTM connection state.

For illustrative purposes, one UE 110 is shown in communication with two BTS 108 in FIG. 1. The downlink (DL), also called the forward link, refers to the communication link from a BTS 108 to a UE 110, and the uplink (UL), also called the reverse link, refers to the communication link from a UE 110 to a BTS 108.

The core network 104 can interface with one or more access networks, such as the GERAN 102. As shown, the core network 104 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more BSCs, such as the BSC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the GERAN 102 to a packet-based network 122. The packet-based network 122 may be the Internet, a private data network, or some other suitable packet-based networks. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

As described above, the illustrated UE 110 is a device having two or more transceivers capable of maintaining two or more simultaneous connections on the GSM network 100 and or other networks. Within the scope of the present disclosure, the UE may utilize the transceivers to simultaneously maintain two or more connections on two or more different radio access technology networks (RATs). Here, such a UE may maintain one or more subscriptions on one or more of a GSM network, a UMTS network, an LTE network, a cdma2000 network, a Wi-MAX network, or any other suitable RAT.

When the UE 110 is used to access one or more access networks with multiple independent active connections simultaneously, the total transmit power may exceed a safe current limit or threshold that my lead to voltage droop and or malfunction of the battery or the device. Further, the simultaneous connection may cause the desense issue.

Figure 2:
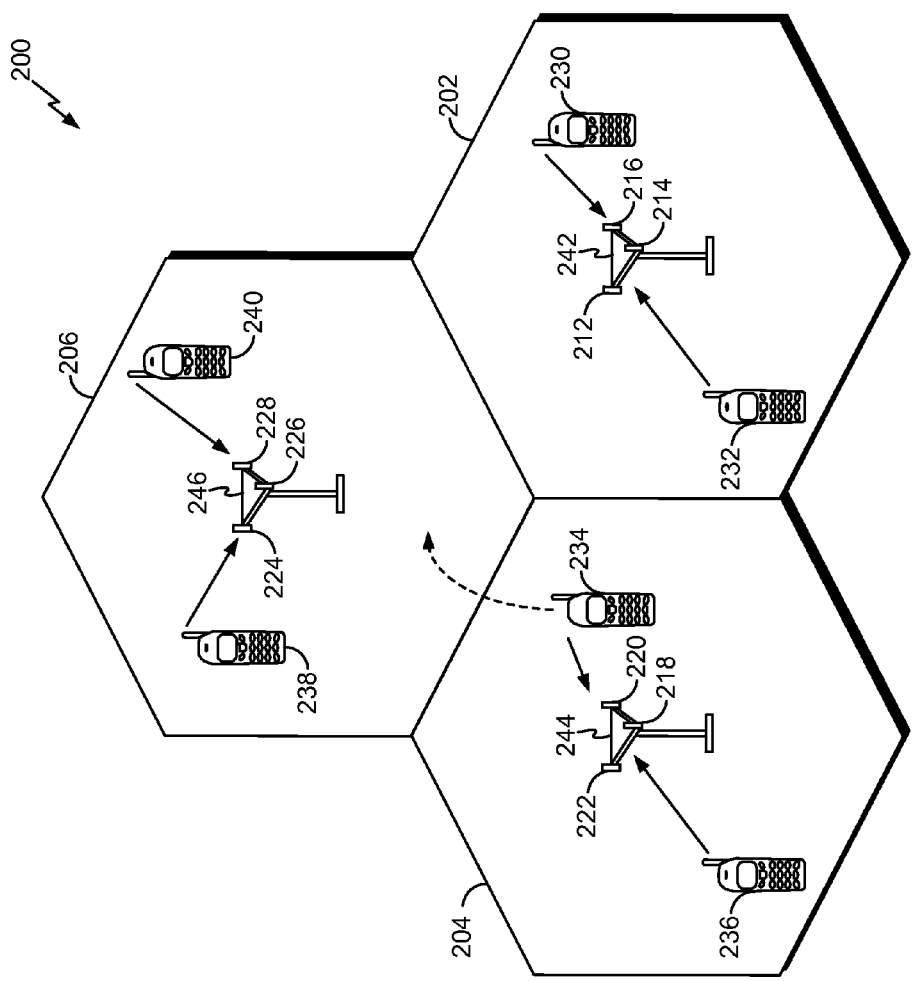
FIG. 2 is a conceptual diagram illustrating an example of an access network according to some embodiments.

The GERAN 102 is one example of a RAN that may be utilized in accordance with the present disclosure. Referring to FIG. 2, by way of example and without limitation, a simplified schematic illustration of a RAN 200 in a GERAN architecture is illustrated. The system includes multiple cellular regions (cells), including cells 202, 204, and 206, each of which may include one or more sectors. Cells may be defined geographically, e.g., by coverage area. In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with a BTS 242, UEs 234 and 236 may be in communication with a BTS 244, and UEs 238 and 240 may be in communication with a BTS 246. Here, each BTS 242, 244, and 246 may be configured to provide an access point to a core network (e.g., 104 in FIG. 1) for all the UEs 230, 232, 234, 236, 238, and 240 in the respective cells 202, 204, and 206.

In one aspect, a UE 236 (e.g., UE 110) may have multiple transceivers such that the UE may be connected to different cells or subscriptions simultaneously.

Figure 3:
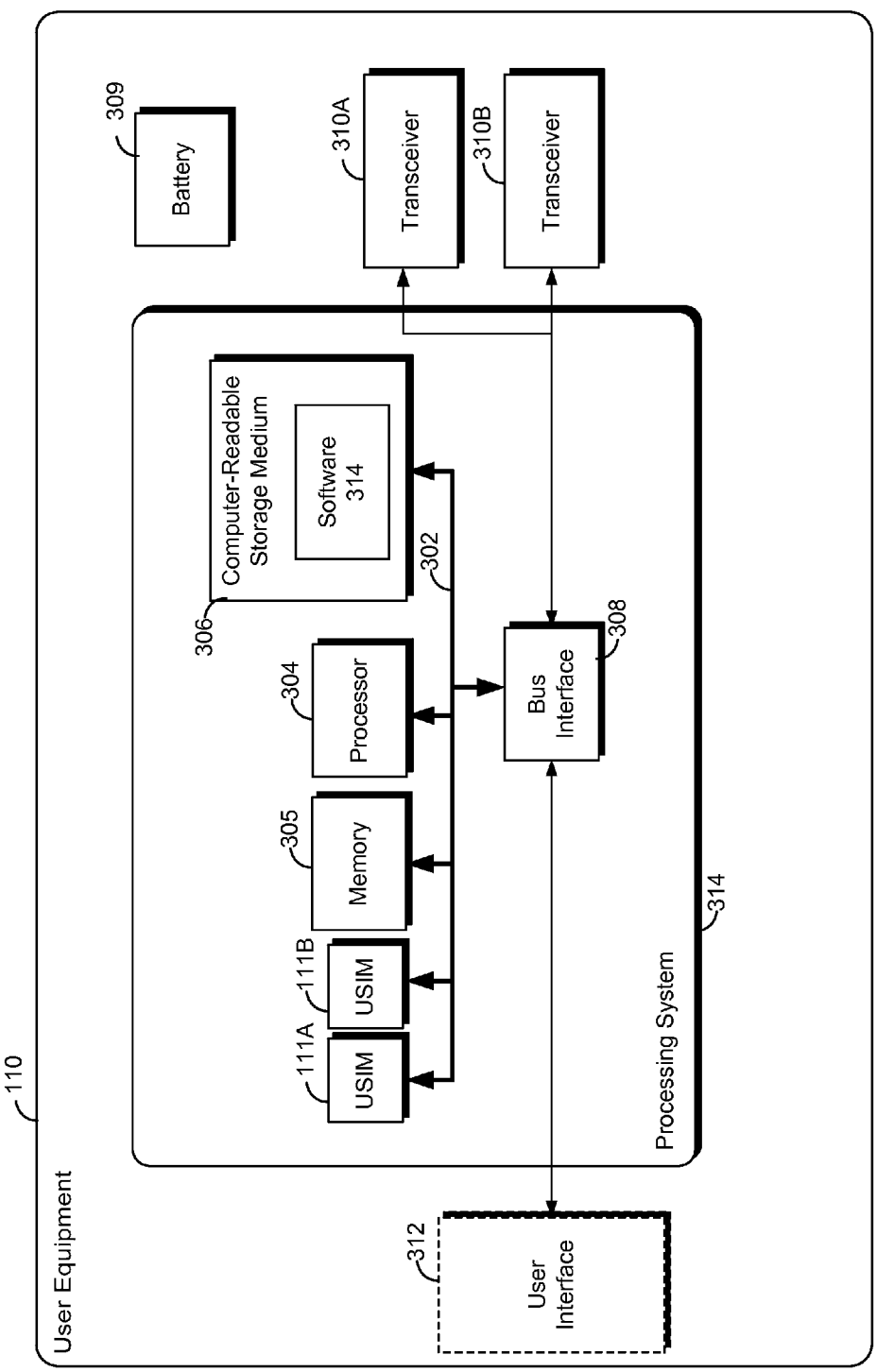
FIG. 3 is a block diagram illustrating an example of a hardware implementation for an apparatus employing a processing system according to some embodiments.

FIG. 3 is a block diagram illustrating an example of a hardware implementation for an apparatus (e.g., a UE 110 or a mobile station) employing a processing system 314. In accordance with various aspects of the disclosure, an element, or any portion of an element, or any combination of elements may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits or components including one or more processors (represented generally by the processor 304), a memory 305, computer-readable media (represented generally by the computer-readable medium 306), and one or more SIMs (e.g. USIMs 111A and 111B). The bus 302 may also link various other circuits such as timing sources, peripherals, voltage regulators, and power management circuits, which are well known in the art, and therefore, will not be described any further. A bus interface 308 provides an interface between the bus 302 and multiple transceivers (e.g., 310A and 310B). The transceivers provide a means for communicating with various other apparatus over a transmission medium. The UE 110 also includes a battery 309 for powering various components such as transceivers 310A and 310B of the UE.

In some examples, the UE 110 includes two USIMs 111A and 111B, and may though each USIM access different subscriptions or networks using a corresponding one of the transceivers 310A and 310B. That is, the UE 110 may maintain two simultaneous connections. However, the broad concepts described herein may also be applicable to devices having more transceivers with or without multiple SIMs.

Depending upon the nature of the apparatus, a user interface 312 (e.g., keypad, display, speaker, microphone, joystick) may also be provided. The processor 304 is responsible for managing the bus 302 and general processing, including the execution of software 314 stored on the computer-readable medium 306. The software 314, when executed by the processor 304, causes the processing system 314 to perform the various functions described infra for any particular apparatus. For example, the software 314 may include code for mitigating voltage droop of the battery 309 during simultaneous transmissions. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

It may be the case that the UE 110 wishes simultaneously or concurrently to perform two different communication activities, including but not limited to connecting with two different networks, or two different subscriptions within the same network, or two cells in a cellular network. Particularly beneficial would be a UE 110 enabled to continue to be engaged in one of these ongoing communication activities (e.g., a CS voice call), while simultaneously performing another communication activity, such as receiving paging messages, performing SMS messaging, or receiving/monitoring other information on a different subscription/connection or from a different cell.

Figure 4:
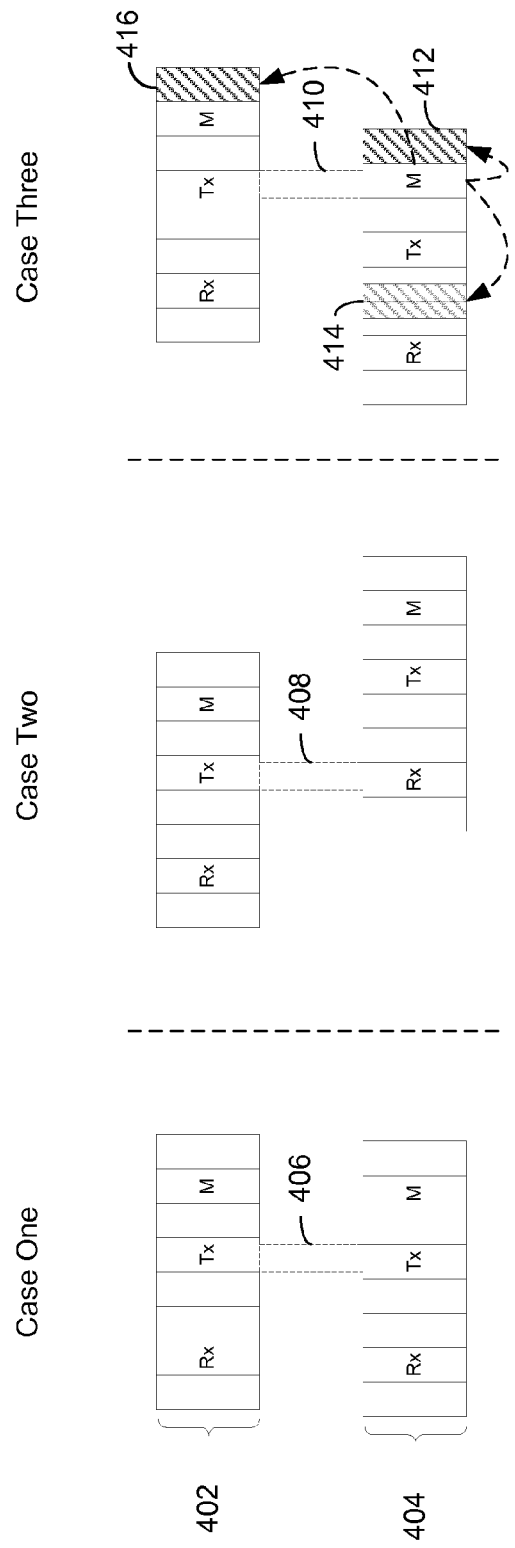
FIG. 4 is a drawing illustrating scenarios where voltage droop and desense may occur.

FIG. 4 is a drawing illustrating scenarios where voltage droop and desense may occur. In this case, a UE (e.g., a UE 110) may utilize two transceivers (e.g., transceivers 310A and 310B) to simultaneously or concurrently transmit on two independent connections 402 and 404 (subscriptions). In case one, the transmitting slots overlaps at least partially in time, resulting in a Tx/Tx clash 406. In this case, when both transceivers are transmitting simultaneously, the amount of current drawn from the battery 309 may cause voltage droop and/or device overheating. Further, simultaneous transmission may cause undesirable amount of radio frequency energy being absorbed by the user (i.e., high SAR) under certain conditions.

In case two, the UE may utilize one transceiver (e.g., transceiver 310A) to transmit on the first connection 402 and another transceiver (e.g., transceiver 310B) to receive on the second connection 404. In this case, the transmitting and receiving slots overlap at least partially in the time, resulting in a Tx/Rx clash 408. In this case, the transmitting slot may cause desense at the receiving slot. In case three, a UE may utilize one transceiver (e.g., transceiver 310A) to transmit on the first connection 402 and another transceiver (e.g., transceiver 310B) to monitor the second connection 404. In this case, the transmitting slot and the monitoring slot M at least partially overlap in time, resulting in another type of Tx/Rx clash 410. To mitigate this clash, the monitoring slot M may be moved to another slot such as slots 412, 414, or 416, for example.

Thus, various aspects of the present disclosure provide for algorithms operational at the mobile device itself, without necessitating intervention by the base station or the network, to resolve issues such as voltage droop, undesirable SAR, overheating, and desense. To address these issues that can occur when two or more transmissions are scheduled to overlap in time, certain transmissions on one or both transmitters may be altered in an effort to prevent this overlap or reduce its effect on the battery voltage. Similarly, for addressing the desense issue, one of the transmit operation or the receive operation may be altered to reduce or eliminate the interference issues described above.

Figure 5:
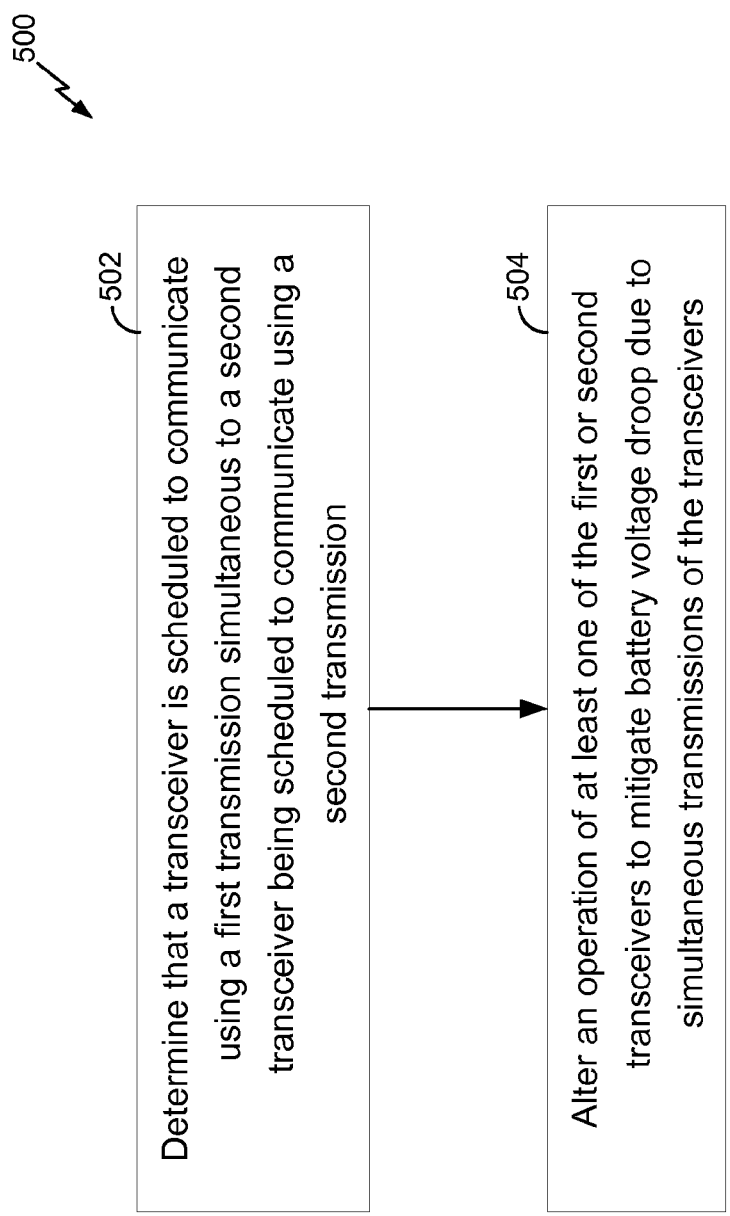
FIG. 5 is a flow chart conceptually illustrating a process for mitigating voltage droop according to some embodiments.

To address voltage droop, SAR, and overheating issues, according to some aspects of the disclosure, the alterations to one or more transmissions may take one of three forms: 1) shift a transmission in time so as not to overlap with the other transmission; 2) forgo to transmit one or the other transmission; and 3) back-off the power of one or more transmissions to reduce or mitigate the voltage droop, SAR, or overheating. FIG. 5 is a flow chart 500 conceptually illustrating a process for mitigating voltage droop, SAR, and overheating according to one aspect of the disclosure. In block 502, a UE (e.g., a UE 110) may determine that a transceiver (e.g., a transceiver 310A) is scheduled to communicate using a first transmission simultaneous to a second transceiver (e.g., a transceiver 310B) being scheduled to communicate using a second transmission. Then, in block 504, the UE 110 may alter an operation of at least one of the first or second transceivers to mitigate battery voltage droop of a battery (e.g., battery 309), SAR, and overheating due to simultaneous transmissions of the transceivers.

To determine which one among two or more transmissions scheduled for simultaneous transmission is the better one to alter, the UE 110 may first determine which transmission is more preferred, or has higher priority than the others. The preference or priority of the transmission can depend upon one or more factors, such as: 1) which connection the user designates as the most important; 2) which transmission is necessary to maintain the connection (e.g., handover access burst after network triggers handover, SDCCH block, etc.); 3) which transmission can be delayed; or 4) which transmission can be discarded without impact to the corresponding active connection or the service (e.g., some voice packets, comfort noise packets, etc.) Once the determination is made, one or the other transmission may be altered. In some examples, both transmissions may be altered.

As an operational example, a UE (e.g., UE 110) with two simultaneous GSM connections (e.g., connections 402 and 404), is used to illustrate aspects of the disclosure. The connections can be idle connections, circuit switched (CS) connections, or packet switched (PS) connections. In an idle state, the UE 110 receives occasionally and does not transmit. If the user wishes to make a call, an access attempt may be initiated by transmitting on a random access channel (RACH). For a CS connection, the UE 110 may transmit on a traffic channel (TCH), a slow associated control channel (SACCH), a standalone dedicated control channel (SDCCH), or a fast associated control channel (FACCH). For a PS connection, the UE 110 may transmit on a packet data channel (PDCH), a packet associated control channel (PACCH), or the relative reserve block period (RRBP) field of an RLC/MAC block header.

FIG. 6 is a table illustrating a power control matrix for determining which one or both among two transmissions scheduled for simultaneous transmissions to alter in order to mitigate battery voltage droop, SAR, and overheating, according to one aspect of the disclosure. Referring to FIG. 6, on the left of the table is shown the states and channels for a first transmitter (e.g., a transceiver 310A on a first subscription), and on the top is shown the states and channels for a second transmitter (e.g., a transceiver 310B on a second subscription). Based on the above-described factors, this matrix shows one example how the selection of one or both of the transmissions to alter is determined, and the particular alteration to make, is illustrated. Accordingly, potential issues such as voltage droop, SAR, and overheating may be prevented or reduced per instant of simultaneous connections.

In FIG. 6, "back-off" means reducing the transmit power of the designated transmission channel. For example, "back-off RACH" means reducing the transmit power of the transmitter utilizing RACH. RACH in the matrix covers both handover access bursts and channel request bursts. In FIG. 6, "delay" means delaying or shifting the time of transmission of the designated transmission channel. In cases 602, it is possible to deploy partial transmission of control block (e.g., just 2 bursts). In cases 604, a suitable priority mechanism may be utilized to determine the preferred transmission. For example, when the simultaneous transmissions both utilize SAACH/SDCCH, the higher priority transmission (subscription) gets to transmit its SACCH/SDCCH burst first. In the matrix of FIG. 6, for cases where "no backup-off" is indicated, it is still possible to back-off within the limits defined in 3GPP TS 45.005, in some aspects. In case 606, when the simultaneous transmissions both utilize TCH, back-off is applied to the subscription with a call one hold.

To address desense issue, one of the transmit operation or the receive operation may be altered to reduce or eliminate the interference issues described above. The alterations to one or the other connection can take one of two forms: 1) shift or delay the transmission in time so as not to overlap with the reception; and 2) forgo to transmit the transmission.

FIG. 7 is a table illustrating a power control matrix 700 for determining which one or both among a transmission and a reception scheduled for simultaneous connections to alter, according to one aspect. That is, a preferred connection or transceiver may be determined using the matrix of FIG. 7 per instant of simultaneous connections (transmission/reception). In the matrix of FIG. 7, the left columns show states and channels a transceiver (e.g., transceiver 310A) may utilize for receiving; the top columns show states and channels a transceiver (e.g., a transceiver 310B) may utilize for transmitting. In some of the intersections of the matrix, one particular action is chosen. For example, in some intersections, such as when one transceiver is receiving on the TCH/FACCH, while the other transceiver is transmitting on the TCH, the priority is given to the active subscription. This matrix shows one example a preferred transceiver may be determined based on a plurality of factors per instance of simultaneous connections, and operations of the transceivers are altered to mitigate the undesirable desense caused by simultaneous connections.

In cases 702, it is possible to deploy partial transmission of a control block (e.g., just 2 bursts). In cases 704, transmission is cancelled only in case of severe desense. In FIG. 7, RACH in the matrix covers both handover access bursts and channel request bursts. The above examples are illustrated using a UE 110 that is operable in a GSM network. However, the present disclosure is not limited as such, and the examples may be implemented in other networks such as a UMTS network.

Aspects of the present disclosure also provide for a back-off algorithm to mitigate battery voltage droop, SAR, and overheating during simultaneous transmission (overlapping slots). A UE (e.g., UE 110) may be configured to limit the maximum instantaneous transmit power per slot to a predetermined transmit power budget. For example, the combined transmit power of two transceivers (e.g., transceivers 310A and 310B) may be limited to a maximum of 33 dBm to avoid or reduce battery voltage droop, SAR, and overheating during simultaneous transmission. In some aspects, a UE may include a suitable algorithm to perform power back-off by apportioning or allocating power to the transceivers based on a number of factors such as respective transmit powers of the transceivers, priority, and the power budget.

Figure 8:
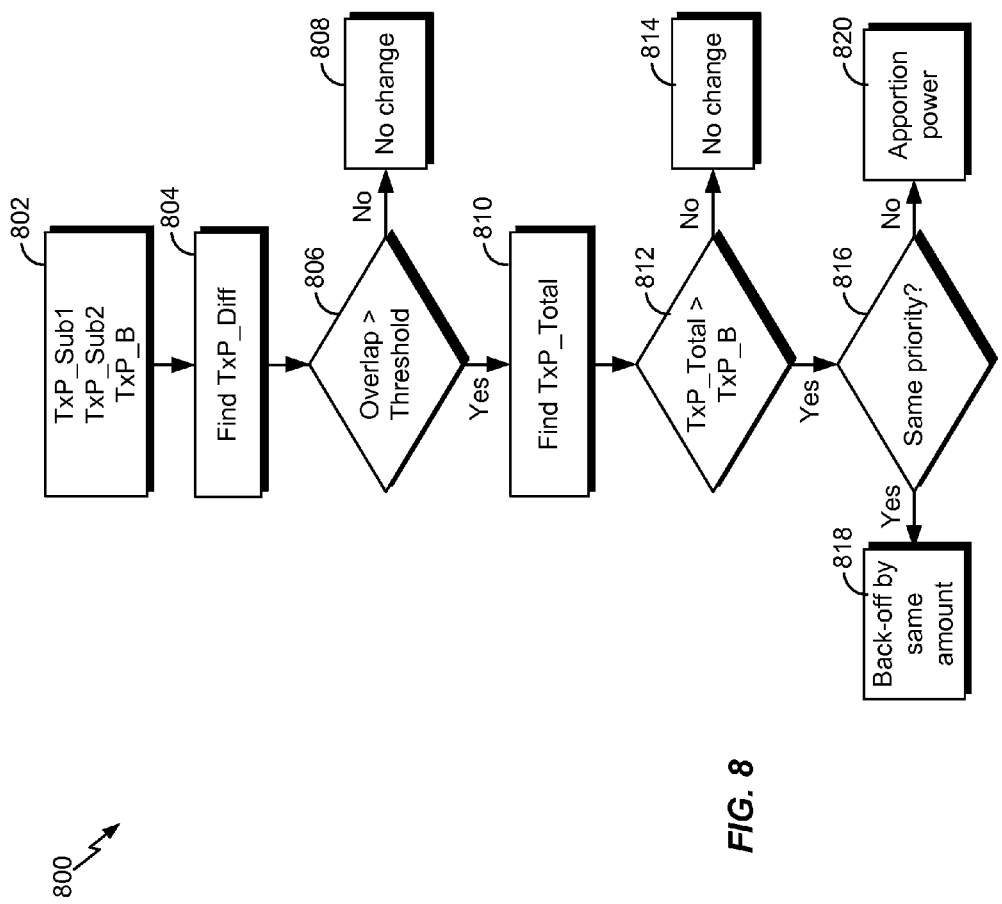
FIG. 8 is a flow chart illustrating an algorithm for performing power back-off at a UE having two transceivers according to some embodiments.

FIG. 8 is a flow chart 800 illustrating an algorithm for performing power back-off at a UE 110 having two transceivers (e.g., transceivers 310A and 310B) according to one aspect of the disclosure. Referring to FIG. 8, the UE 110 determines that the transceivers are scheduled to transmit simultaneously or concurrently using the two transceivers on first and second subscriptions, respectively. In block 802, the transmit power (TxP_Sub1) of the transceiver corresponding to the first subscription is determined, and the transmit power (TxP_Sub2) of the transceiver corresponding to the second subscription is also determined. In addition, a transmit power budget TxP_B may also be determined. In block 804, the difference in power (TxP_Diff) between TxP_Sub1 and TxP_Sub2 is determined. In block 806, it is determined whether or not the overlap in time between the transmissions is greater than a threshold value (e.g., a quarter of a timeslot). If the overlap is less than the threshold, the algorithm continues to block 808. If the overlap is greater than the threshold, the algorithm continues to block 810.

In block 808, no back-off is performed. That is, there is no change to the transmit power TxP_Sub1 and TxP_Sub1. In block 810, the total transmit power TxP_total may be determined based on TxP_Sub1, TxP_Sub2, and a suitable lookup table indexed using TxP_Diff. In block 812, it is determined whether or not TxP_total is greater than TxP_B. If TxP_Total is not greater than TxP_B, the process continues to block 814. If TxP_Total is greater than TxP_B, the process continues to block 816. In block 814, no back-off is performed. That is, there is no change to the transmit power TxP_Sub1 and TxP_Sub2. In block 816, the relative priority of the transmissions (first and second subscriptions) is determined. If the transmissions have the same priority, the algorithm continues to block 818. If the transmissions have different priority, the algorithm continues to block 820. In block 818, same amount of back-off may be applied to both transmissions. In one aspect, the amount of back-off may be equal to the difference between TxP total and TxP_B. In block 820, the final values of TxP_Sub1 and TxP_Sub2 are adjusted based on the priority of the transmissions, the available power budget TxP_B, and other suitable factors.

In one configuration, a UE (e.g., UE 110) for wireless communication includes: means for determining that a first transceiver is scheduled to communicate using a first connection simultaneous to a second transceiver being scheduled to communicate using a second connection; and means for altering an operation of at least one of the first and second transceivers to mitigate interference on the preferred transceiver due to simultaneous connections of the transceivers. In one aspect, the aforementioned means may be the processor(s) 304 in which the invention resides from FIG. 3 configured to perform the functions recited by the aforementioned means. In another aspect, the aforementioned means may be a module or any apparatus configured to perform the functions recited by the aforementioned means.

Several aspects of a telecommunications system have been presented with reference to a GERAN system. As those skilled in the art will readily appreciate, various aspects described throughout this disclosure may be extended to other telecommunication systems, network architectures and communication standards.

By way of example, various aspects may be extended to UMTS systems such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of wireless communication using a user equipment (UE) comprising a battery, a first transceiver and a second transceiver, the method comprising:
determining that the first transceiver is scheduled to communicate using a first transmission simultaneous to the second transceiver being scheduled to communicate using a second transmission;

altering an operation of at least one of the first and second transceivers to mitigate battery voltage droop due to simultaneous transmissions of the transceivers; and determining the operation to be altered based on a power control matrix per instant of simultaneous transmissions, wherein the power control matrix comprises operating states of the first and second transceivers during simultaneous transmissions, the operating states comprising an idle state, a circuit-switched (CS) connection state, a packet-switched (PS) connection state, and a dual transfer mode (DTM) connection state.

2. The method of claim 1, wherein the altering the operation of at least one of the first and second transceivers, comprises forgoing a transmission of at least one of the transceivers to reduce specific absorption rate due to simultaneous transmission.

3. The method of claim 1, wherein the altering the operation of at least one of the first and second transceivers, comprises forgoing a transmission of at least one of the transceivers to mitigate overheating of the UE due to simultaneous transmission.

4. The method of claim 1, wherein the altering the operation of at least one of the first and second transceivers comprises altering a transmission of at least one of the transceivers to reduce power of the transmission, to shift the transmission in time, or to forgo the transmission.

5. The method of claim 1, wherein the power control matrix comprises channels to be utilized by the first and second transceivers during simultaneous transmissions, the channels comprise one or more of Random Access Channel (RACH), Traffic Channel (TCH), Slow Associated Control Channel (SACCH), Standalone Dedicated Control Channel (SDCCH), Fast Associated Control Channel (FACCH), Packet Dedicated Channel (PDCH), and Packet Associated Control Channel (PACCH).

6. The method of claim 1, wherein the altering the operation of at least one of the first and second transceivers comprises adjusting respective transmit power of the first and second transceivers to limit their combined transmit power not exceeding a power budget.

7. The method of claim 6, wherein the adjusting respective transmit power comprises adjusting the transmit power of the transceivers based on respective priority of the transceivers and the power budget.

8. The method of claim 7, wherein the adjusting the transmit power of the transceivers comprises allocating respective portions of the power budget to the transceivers based on their priority.

9. An apparatus for wireless communication comprising:
a battery;
a first transceiver and a second transceiver;
means for determining that the first transceiver is scheduled to communicate using a first connection simultaneous to the second transceiver being scheduled to communicate using a second connection;
means for altering an operation of at least one of the first and second transceivers to mitigate battery voltage droop due to simultaneous connections of the transceivers; and
means for determining the operation to be altered based on a power control matrix per instant of simultaneous transmissions,
wherein the power control matrix comprises operating states of the first and second transceivers during simultaneous transmissions, the operating states comprising an idle state, a circuit-switched (CS) connection state, a packet-switched (PS) connection state, and a dual transfer mode (DTM) connection state.

10. The apparatus of claim 9, wherein the means for altering the operation, is configured to forgo a transmission of at least one of the transceivers to reduce specific absorption rate due to simultaneous transmission.

11. The apparatus of claim 9, wherein the means for altering the operation, is configured to forgo a transmission of at least one of the transceivers to mitigate overheating of the apparatus due to simultaneous transmission.

12. The apparatus of claim 9, wherein the means for altering the operation of at least one of the first and second transceivers comprises means for altering a transmission of at least one of the transceivers to reduce power of the transmission, to shift the transmission in time, or to forgo the transmission.

13. The apparatus of claim 9, wherein the power control matrix comprises channels to be utilized by the first and second transceivers during simultaneous transmissions, the channels comprise one or more of Random Access Channel (RACH), Traffic Channel (TCH), Slow Associated Control Channel (SACCH), Standalone Dedicated Control Channel (SDCCH), Fast Associated Control Channel (FACCH), Packet Dedicated Channel (PDCH), and Packet Associated Control Channel (PACCH).

14. The apparatus of claim 9, wherein the means for altering the operation of at least one of the first and second transceivers comprises means for adjusting respective transmit power of the first and second transceivers to limit their combined transmit power not exceeding a power budget.

15. The apparatus of claim 14, wherein the means for adjusting respective transmit power comprises means for adjusting the transmit power of the transceivers based on respective priority of the transceivers and the power budget.

16. The apparatus of claim 15, wherein the means for adjusting the transmit power of the transceivers comprises means for allocating respective portions of the power budget to the transceivers based on their priority.

17. A computer program product, comprising:
a non-transitory computer-readable storage medium comprising code for causing a user equipment (UE) to:
determine that a first transceiver of the UE is scheduled to communicate using a first transmission simultaneous to a second transceiver of the UE being scheduled to communicate using a second transmission;
alter an operation of at least one of the first and second transceivers to mitigate battery voltage droop of a battery of the UE due to simultaneous transmissions of the transceivers; and
determine the operation to be altered based on a power control matrix per instant of simultaneous transmissions,
wherein the power control matrix comprises operating states of the first and second transceivers during simultaneous transmissions, the operating states comprising an idle state, a circuit-switched (CS) connection state, a packet-switched (PS) connection state, and a dual transfer mode (DTM) connection state.

18. The computer program product of claim 17, wherein the code for causing the UE to alter the operation, comprises code for causing the UE to forgo a transmission of at least one of the transceivers to reduce specific absorption rate due to simultaneous transmission.

19. The computer program product of claim 17, wherein the code for causing the UE to alter the operation, comprises code for causing the UE to forgo a transmission of at least one of the transceivers to mitigate overheating of the UE due to simultaneous transmission.

20. The computer program product of claim 17, wherein the code for causing the UE to alter the operation comprises code for causing the UE to alter a transmission of at least one of the transceivers to reduce power of the transmission, to shift the transmission in time, or to forgo the transmission.

21. The computer program product of claim 17, wherein the power control matrix comprises channels to be utilized by the first and second transceivers during simultaneous transmissions, the channels comprise one or more of Random Access Channel (RACH), Traffic Channel (TCH), Slow Associated Control Channel (SACCH), Standalone Dedicated Control Channel (SDCCH), Fast Associated Control Channel (FACCH), Packet Dedicated Channel (PDCH), and Packet Associated Control Channel (PACCH).

22. The computer program product of claim 17, wherein the code for causing the UE to alter the operation comprises code for causing the UE to adjust respective transmit power of the first and second transceivers to limit their combined transmit power not exceeding a power budget.

23. The computer program product of claim 22, wherein the code for causing the UE to adjust respective transmit power comprises code for causing the UE to adjust the transmit power of the transceivers based on respective priority of the transceivers and the power budget.

24. The computer program product of claim 23, wherein the code for causing the UE to adjust the transmit power of the transceivers comprises code for causing the UE to allocate respective portions of the power budget to the transceivers based on their priority.

25. An apparatus for wireless communication, comprising:
a battery;
at least one processor;
a communication interface comprising a first transceiver and a second transceiver both coupled to the at least one processor; and
a memory coupled to the at least one processor,
wherein the at least one processor is configured to:
determine that the first transceiver is scheduled to communicate using a first transmission simultaneous to the second transceiver being scheduled to communicate using a second transmission;
alter an operation of at least one of the first and second transceivers to mitigate battery power droop due to simultaneous transmissions of the transceivers; and
determine the operation to be altered based on a power control matrix per instant of simultaneous transmissions,
wherein the power control matrix comprises operating states of the first and second transceivers during simultaneous transmissions, the operating states comprising an idle state, a circuit-switched (CS) connection state, a packet-switched (PS) connection state, and a dual transfer mode (DTM) connection state.

26. The apparatus of claim 25, wherein the at least one processor is further configured to forgo a transmission of at least one of the transceivers to reduce specific absorption rate due to simultaneous transmission.

27. The apparatus of claim 25, wherein the at least one processor is further configured to forgo a transmission of at least one of the transceivers to mitigate overheating of the apparatus due to simultaneous transmission.

28. The apparatus of claim 25, wherein the at least one processor is further configured to alter a transmission of at least one of the transceivers to reduce power of the transmission, to shift the transmission in time, or to forgo the transmission.

29. The apparatus of claim 25, wherein the power control matrix comprises channels to be utilized by the first and second transceivers during simultaneous transmissions, the channels comprise one or more of Random Access Channel (RACH), Traffic Channel (TCH), Slow Associated Control Channel (SACCH), Standalone Dedicated Control Channel (SDCCH), Fast Associated Control Channel (FACCH), Packet Dedicated Channel (PDCH), and Packet Associated Control Channel (PACCH).

30. The apparatus of claim 25, wherein the at least one processor is further configured to adjust respective transmit power of the first and second transceivers to limit their combined transmit power not exceeding a power budget.

31. The apparatus of claim 30, wherein the at least one processor is further configured to adjust the transmit power of the transceivers based on respective priority of the transceivers and the power budget.

32. The apparatus of claim 31, wherein the at least one processor is further configured to allocate respective portions of the power budget to the transceivers based on their priority.

* * * * *